US008332307B1

(12) United States Patent
Gastineau

(10) Patent No.: US 8,332,307 B1
(45) Date of Patent: *Dec. 11, 2012

(54) VARIANTS OF NAV-BASED TRADING FOR LESS CLOSELY-LINKED COMPONENTS OF INDEX ARBITRAGE COMPLEXES

(75) Inventor: Gary L. Gastineau, Short Hills, NJ (US)

(73) Assignee: Navigate Fund Solutions LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,695

(22) Filed: Apr. 19, 2011

Related U.S. Application Data

(63) Continuation-in-part of application No. 12/425,044, filed on Apr. 16, 2009, and a continuation-in-part of application No. 12/056,958, filed on Mar. 27, 2008, and a continuation-in-part of application No. 12/056,980, filed on Mar. 27, 2008, now Pat. No. 8,131,621, said application No. 12/056,958 is a continuation-in-part of application No. 11/714,923, filed on Mar. 7, 2007, now Pat. No. 7,496,531, said application No. 12/056,980 is a continuation-in-part of application No. 11/714,923, filed on Mar. 7, 2007, now Pat. No. 7,496,531, which is a continuation-in-part of application No. 11/141,243, filed on May 31, 2005, now Pat. No. 7,444,300.

(51) Int. Cl.
*G06Q 40/00* (2012.01)
(52) U.S. Cl. .............................. 705/37; 705/35
(58) Field of Classification Search .................. 705/35, 705/37
See application file for complete search history.

(56) References Cited

U.S. PATENT DOCUMENTS

| 5,262,942 | A | * | 11/1993 | Earle ............................. 705/37 |
| 5,806,048 | A | | 9/1998 | Kiron et al. |
| 5,845,266 | A | | 12/1998 | Lupien et al. |
| 5,884,285 | A | * | 3/1999 | Atkins ......................... 705/36 R |
| 5,926,792 | A | * | 7/1999 | Koppes et al. ................. 705/4 |
| 5,946,667 | A | | 8/1999 | Tull et al. |
| 5,983,204 | A | | 11/1999 | Debe |

(Continued)

OTHER PUBLICATIONS

Baldwin, William, "How to Profit From Single-Stock Futures," Forbes Magazine (Apr. 7, 2010). http://www.forbes.com/2010/04/07/dividend-tax-futures-personal-finance-capital-gains.html.

(Continued)

*Primary Examiner* — Narayanswamy Subramanian
*Assistant Examiner* — Stephanie M Ziegle
(74) *Attorney, Agent, or Firm* — Sampson & Associates, P.C.

(57) ABSTRACT

Systems and methods are provided in which a first module is configured to execute a trade of a securities futures product on an underlying financial instrument for which a valuation relative to at least one of (a) a net asset value and (b) a closing price, is calculated and published at or after a specified time. A second module determines a price for the executed trade, in which the price is specified relative to the valuation and/or the valuation with a basis adjustment. The second module may be configured to use a price which is (a) a first price which is at a specified discount, (b) a second price which is substantially equal, and/or (c) a third price which is at a premium, to the valuation or valuation with basis adjustment. A third module is configured to submit the executed trade for settlement at the determined price.

48 Claims, 5 Drawing Sheets

U.S. PATENT DOCUMENTS

| | | | |
|---|---|---|---|
| 6,012,046 | A | 1/2000 | Lupien et al. |
| 6,029,146 | A | 2/2000 | Hawkins et al. |
| 6,088,685 | A | 7/2000 | Kiron et al. |
| 6,098,051 | A | 8/2000 | Lupien et al. |
| 6,236,972 | B1 | 5/2001 | Shkedy |
| 6,411,939 | B1 * | 6/2002 | Parsons ............ 705/35 |
| 6,418,419 | B1 | 7/2002 | Nieboer et al. |
| 6,564,192 | B1 | 5/2003 | Kinney, Jr. et al. |
| 6,879,964 | B2 | 4/2005 | Sauter et al. |
| 6,941,280 | B1 | 9/2005 | Gastineau et al. |
| 7,025,387 | B2 | 4/2006 | Twardawski et al. |
| 7,089,205 | B1 * | 8/2006 | Abernethy ............ 705/37 |
| 7,099,838 | B1 | 8/2006 | Gastineau et al. |
| 7,110,974 | B1 | 9/2006 | Rust |
| 7,231,362 | B2 * | 6/2007 | Wilce et al. ............ 705/35 |
| 7,444,300 | B1 | 10/2008 | Broms et al. |
| 7,496,531 | B1 | 2/2009 | Gastineau et al. |
| 7,533,048 | B2 * | 5/2009 | Madhavan et al. ......... 705/36 R |
| 7,689,501 | B1 | 3/2010 | Gastineau et al. |
| 2001/0025266 | A1 | 9/2001 | Gastineau et al. |
| 2002/0128947 | A1 | 9/2002 | Sauter et al. |
| 2002/0194107 | A1 | 12/2002 | Li et al. |
| 2003/0177077 | A1 | 9/2003 | Norman |
| 2003/0177086 | A1 | 9/2003 | Gomber et al. |
| 2003/0177126 | A1 | 9/2003 | Weingard et al. |
| 2003/0225662 | A1 * | 12/2003 | Horan et al. ............ 705/36 |
| 2003/0233302 | A1 | 12/2003 | Weber et al. |
| 2005/0027638 | A1 | 2/2005 | Ng et al. |
| 2005/0108146 | A1 | 5/2005 | Bond |
| 2009/0182684 | A1 | 7/2009 | Shalen |

OTHER PUBLICATIONS

Baldwin, William, "They're Clipping Your Dividends," Forbes Magazine, (Apr. 26, 2010). http://www.forbes.com/forbes/2010/0426/opinions-william-baldwin-obama-dividend-tax-side-lines.html.

Bookstaber Richard, A Demon of Our Own Design: Markets, Hedge Funds, and the Perils of Financial Innovation, Hoboken, NJ: John Wiley & Sons, 2007: 225-226.

Broms, T. J., and Gary L. Gastineau, "The Development of Improved Exchange-Traded Funds (ETFs) in the United States," In New Financial Instruments and Institutions, eds. Y. Fuchita and R. E. Litan. Washington, DC: The Brookings Institution, 193-209, and also in A Guide to Exchange-Traded Funds and Indexing Innovations, 6th ed. New York: Institutional Investor (2007), 16-26. http://www.etfconsultants.com/images/Brookings_Institution_2.pdf.

Cano, Guillermo, Barry E. Feldman, and Joseph Smith, "ETFs, Swaps, and Futures: Trade at Index Close (TIC) and the Coevolution of Financial Markets," Institutional Investor, (Fall 2009): 50-58.

Dick, Dennis, "The Tracks of My Tiers," CFA Magazine, (Jul.-Aug. 2010), vol. 21, No. 4: 30-31.

Gastineau, Gary L., and Mark Kritzman, Dictionary of Financial Risk Management, Frank J. Fabozzi Associates, Hoboken, NJ: John Wiley & Sons, 1996 and 1999: 22 and 32.

Gastineau, Gary L. The Exchange-Traded Fund Manual. Hoboken, NJ: John Wiley & Sons, 2002, Second edition, 2010.

Gastineau, Gary L. Someone Will Make Money On Your Funds-Why Not You?: Better Way to Pick Mutual and Exchange-Traded Funds. Hoboken, NJ: John Wiley & Sons, 2005.

Gastineau, Gary L., "The Cost of Trading Transparency: What We Know, What We Don't Know, and How We Will Know," Journal of Portfolio Management, (Fall 2008):72-81.

FA News; ETFs Shunned by Many 401(k) Plans; Aug. 4, 2010 http://www.fa-mag.com/fa-news/5894-etfs-shunned-by-many-401k-plans.html?tmpl=component&print=1 . . . .

Hougan, Matt, "The Flaws in iNAV," Exchange-Traded Funds Report (ETFR), (Jul. 2009): 5-10.

ICE Futures U.S., TIC Trading, (Jan. 2009): v1.3. https://www.theice.com/publicdocs/futures_us/TIC_FAQ.pdf.

Linnainmaa, Juhani T., "Do Limit Orders Alter Inferences about Investor Behavior?," Journal of Finance, (Aug. 2010): 1473-1506.

Melas, Dimitris and Xiaowei Kang, "Applications of Systemic Indexes In The Investment Process," Journal of Indexes, (Sep./Oct. 2010):10-18.

NYSE Rule 2009-111 Refile.

NYSE Rule 2010-14, 75 FR 10538 Mar. 8, 2010.

Prestbo, John, A., The Market's Measure, New York, Dow Jones, 1999, p. 23.

Trade Management Guidelines http://www.cfainstitute.org/ethics/codes/trade/Pages/index.aspx.

Advanced Trading, Sep. 2010. http://i.cmpnet.com/financetech/download/AT_Digital-Issue_2010_09.pdf.

LeBlanc, Sydney; Article "Do You Know Them?" published on Wall Street, Oct. 1, 2004, p. 1.

Berk, Jonathan B. and Richard C. Green, "Mutual Fund Flows and Performance in Rational Markets" Journal of Political Economy, vol. 112 No. 6, Dec. 2004, 1269-1295, (available at http://www.journals.uchicago.edu/JPE/journal/contents/v112n6.html).

Chapman, Peter; Cover Story: Converge & Diverge; Traders Magazine, Apr. 2011; (available at http://www.tradersmagazine.com/issues/24_321/ems-nangalia-woodbine-realtick-107422- . . . ).

* cited by examiner

200

| TEMPLATE INDEX | MATCH |
|---|---|
| Index Futures Contracts | Close link |
| Options on Index Futures Contracts | |
| ETFs | |
| Options on ETFs | |
| Single Stock Futures on ETFs | Weaker link |

| Securities Market Transaction ||||
| Long | Profit (Loss) | Short | Profit (Loss) |
|---|---|---|---|
| Buy 1 SPY share @ $110 | | Sell 1 SPY share short @ $110 | |
| Sell 1 SPY share @ $110 | | Buy 1 SPY share back @ $110 | |
| | 0 | | 0 |

*Both parties lose their commissions and use of their money for 61 days*

| Single Stock Futures Transaction ||||
| Long | Profit (Loss) | Short | Profit (Loss) |
|---|---|---|---|
| Buy 1 share SSF SPY @ $111 | | Sell 1 share SSF SPY @ $111 | |
| Sell 1 share SSF SPY @ $110.50 | ($0.50) | Buy 1 share SSF SPY @ $110.50 | $0.50 |
| Interest on $110 @ 6% for 61 days | $1.00 | | |
| | $0.50 | | $0.50 |

*Both parties earn a profit before commissions*

VARIANTS OF NAV-BASED TRADING FOR LESS CLOSELY-LINKED COMPONENTS OF INDEX ARBITRAGE COMPLEXES

CROSS REFERENCE TO RELATED APPLICATIONS

The present application claims priority as a continuation in part to U.S. Non-Provisional application Ser. No. 12/425,044, filed on Apr. 16, 2009 and as a continuation-in-part of pending U.S. patent application Ser. No. 12/056,958, filed on Mar. 27, 2008, and as a continuation-in-part of pending U.S. patent application Ser. No. 12/056,980, filed on Mar. 27, 2008 now U.S. Pat. No. 8,131,621, the latter two applications both being continuations-in-part of application Ser. No. 11/714,923, now U.S. Pat. No. 7,496,531, filed on Mar. 7, 2007, which is a continuation-in-part of application Ser. No. 11/141,243, now U.S. Pat. No. 7,444,300, filed on May 31, 2005, all of which are incorporated herein by reference in their entireties.

BACKGROUND OF THE INVENTION

1. Field of the Invention

The invention relates generally to financial services, and, in particular, to offering and making choices between and among available instruments linked more or less closely to an underlying index, a financial instrument or a portfolio of financial instruments and choices between and among order entry and execution mechanisms in trading securities futures products on financial instruments for which a net asset value or other specified value such as a closing price is periodically calculated.

2. Background

The series of inventions that began with U.S. Pat. No. 7,444,300, filed on May 31, 2005 all relate to the development, operation, trading and other aspects of exchange traded portfolio or basket instruments for which a net asset value is periodically calculated. U.S. Pat. No. 7,496,531 filed on Mar. 7, 2007 relates to a net asset value-based trading mechanism. The instant inventor has recognized a need for extending aspects of U.S. Pat. No. 7,496,531 to derivative instruments, specifically securities futures products (SFPs) or single stock futures (SSFs) on financial instruments for which a net asset value or other specified value is periodically calculated. The instant inventor has also recognized a need to extend NAV-based trading and trading at or relative to other specified values to these derivative contracts where the price and/or value of the contract is linked to the underlying exchange-traded funds, notes, trusts or other portfolio instruments which have been the subject of the referenced patents and patent applications and to securities futures products with other underlying instruments.

BRIEF SUMMARY OF THE INVENTION

Non-provisional patent application Ser. No. 12/425,044, the most recent application of which the present application is a continuation-in-part, describes methodologies for evaluating which of various trading mechanisms will deliver best execution to an investor, given the choice of a variety of orders and order entry mechanisms and a variety of trading facilities such as conventional stock or exchange-traded fund markets and markets that offer NAV-based trading. The present invention relates to the choice between exchange traded securities for which a net asset value or another value is periodically calculated and a securities futures contract on that security and, correspondingly, on a trading mechanism for the securities futures contract which is analogous in many respects to the NAV-based trading described in earlier patents and patent applications.

In accordance with one aspect of the invention, a system includes a first module configured to execute a trade of a securities futures product on an underlying financial instrument for which a valuation relative to at least one of (a) a net asset value and (b) a closing price, is calculated and published at or after a specified time. A second module is configured to determine a price for the executed trade, in which the price is specified relative to the valuation or the valuation with a basis adjustment. The second module may be configured to determine a price which is one of (a) a first price which is at a specified discount, (b) a second price which is substantially equal, and (c) a third price which is at a premium to the valuation or valuation with basis adjustment. A third module is configured to submit the executed trade for settlement at the determined price.

In another aspect of the invention, a computer-based method is provided for trading an exchange-listed securities futures product (SFP) on an underlying financial instrument for which a valuation equal to at least one of (a) a net asset value and (b) a closing price can be calculated, with such trading conducted on or away from an exchange. The method includes executing a trade of said SFP at a price determined for the executed trade, from a set of prices that are specified relative to at least one of (i) said valuation and (ii) said valuation with a basis adjustment. The set of prices include (a) a first price that is at a specified discount to, (b) a second price that is at, and (c) a third price that is at a premium to, at least one of (i) the valuation and (ii) the valuation with a basis adjustment. The executed trade is submitted for settlement at the determined price.

In yet another aspect of the invention, a computer program product includes a computer usable medium having computer program logic recorded thereon for enabling a processor to trade an exchange-listed securities futures product (SFP) as described in at least one of the foregoing aspects.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 2 compares, side-by-side, the relationship of various index arbitrage complex component values to the index. For example, the index will, of course, match itself. As we move down the list on the right hand side of FIG. 2 the linkage in terms of price behavior to the template index becomes weaker (or, rather, less fully determined) as we move down the list.

FIG. 3 is a comparative calculation of opportunities for profit or loss by long and short investors in securities market transactions and transactions with comparable market level risk characteristics in single stock futures contracts.

Figure 1:
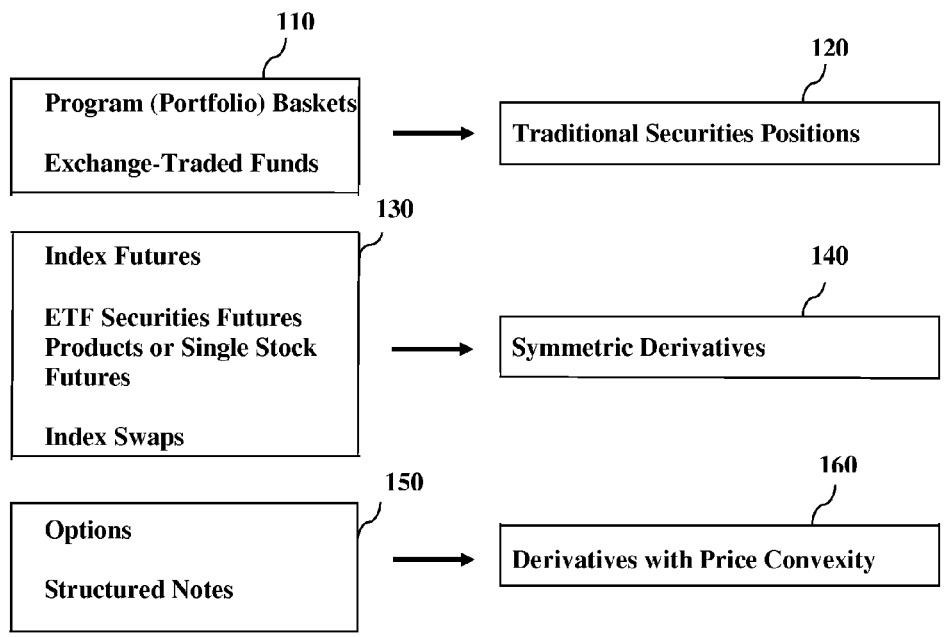
FIG. 1 shows the relationship of various financial instruments to each other in terms of the way they respond to changes in the prices of the ultimate underlying instruments that comprise their portfolios; grouping the related financial instruments into traditional securities positions, symmetric derivatives and derivatives with price convexity.

The features and advantages of the present invention will become more apparent from the detailed description set forth below when taken in conjunction with the drawings.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to implement such feature, structure, or characteristic in connection with other embodiments whether or not explicitly described.

An embodiment consists of major and subsidiary components implemented through a variety of separate and related computer systems. These components may be used either individually or in a variety of combinations to achieve the objectives of choosing the optimum instrument as well as the optimum trading mechanism (conventional intraday transactions or NAV-based or other value-based transactions) for taking the position in the instrument selected. The opportunities to integrate the systems covered by the present invention with the methodologies and computer related systems of previous inventions covered by the patents and patent applications listed in the cross reference to related applications which are incorporated herein by reference in their entirety, will enable a person skilled in the pertinent art to make and use these inventions together.

The following features comprise some of the features of one or more embodiments of the invention, and are presented by way of example, and not limitation.

Portfolio Trading and Stock Index Arbitrage Complexes

The basic idea of trading an entire portfolio in a single transaction originated with what has come to be known as portfolio trading or program trading. In the 1980s, portfolio trading was the then revolutionary ability to trade an entire portfolio of stocks as a basket. In the U.S., this was often a portfolio consisting of all the stocks in the S&P 500 index. The portfolio trade was typically initiated with a single order placed with a major brokerage firm. Similar portfolio trades were available using other U.S. indexes and popular indexes in Canada, Europe and Asia. Today, index-based and customized portfolio trading is available in nearly all of the world's stock markets and in many other securities and futures markets covering debt, currencies and commodities among other classes of assets. The examples herein are based on stock index portfolios because indexes are widely used as the basis for constructing standardized stock baskets and stock index arbitrage complexes are among the most fully-developed examples of the genre. The principles described here apply with varying degrees of generality to baskets and indexes in fixed income, currency, commodity and other markets where portfolios or combinations of commodities and/or financial instruments are traded.

Some relatively modest advances in electronic trade entry and execution technology for equity securities and the availability of large order desks at some major investment banking and brokerage firms made early stock portfolio or program trades possible. The introduction of S&P 500 index futures contracts by the Chicago Mercantile Exchange (and similar contracts on other indexes and on other markets) created and required an arbitrage pricing link between the new futures contracts and portfolios of the stocks in the index underlying the futures contract. It is possible, in a trade called an exchange of futures for physicals (EFP) to exchange a stock portfolio position, long or short, for a stock index futures position, long or short. The attractions of this trading activity include opportunities for arbitrage profits and, more importantly, lower trading costs stemming in part from the fact that the market impact of the trade is spread over the markets in many individual stocks and other derivative markets. Index arbitrage complexes were a natural consequence of these market developments.

The relationships among trading in equity and debt portfolios and trading in various derivatives markets based on such portfolios are best understood by considering how the components of an arbitrage complex relate to one another. The arbitrage complex provides a useful way to think about the range of choices open to users of index (or portfolio basket) financial instruments. Although an arbitrage complex can be based on physical commodities, most are based on financial instruments, including commodity derivatives. Consequently, we use financial markets as the principal models. An arbitrage complex may consist of a number of related financial instruments or groups of financial instruments based on a common basket of underlying assets. The principal underlying behind each of the components of an arbitrage complex may be an index, a securities basket determined by index rules, an exchange-traded fund (ETF) and other financial instruments. The arbitrage complex can cover domestic and/or foreign markets. An equity or commodity arbitrage complex can include components that are nominally debt instruments (structured notes) and it can include futures, options and other components that have a non-linear price relationship to changes in the ultimate underlying price(s).

FIG. 1 is a diagram illustrating the relationship between a variety of financial instruments and basket products in the left hand column and their market price behavior.

Among the traditional securities positions 110 in the first category 120 of index arbitrage complex components are program- or portfolio-traded baskets of securities and exchange-traded funds (ETFs). ETFs are simply combinations and extensions of the traditional underlying securities that make up the traded portfolios. Trading securities in a basket or as an index derivative is a natural extension of both trading technology and the risk reducing diversification that is a cornerstone of modern portfolio theory.

The second group is symmetric derivatives 140. By symmetric, we mean that their prices move up and down very much in line with the underlying index or portfolio that determines their market risk characteristics. The most important symmetric derivative instruments in most securities-based arbitrage complexes are index futures, ETF securities futures products or single-stock futures contracts and index swaps 130. Many observers also categorize typical unleveraged ETF shares as symmetric derivatives. To round out the major possibilities, the principal asymmetrical instruments in an index arbitrage complex are index options and options on ETFs, options on futures and options to enter into swap contracts, often called swaptions. There are also structured notes based on indexes, ETFs or futures contracts. Leveraged ETFs are not listed, but they have characteristics that typically make their returns asymmetric—and increasingly complex—over time. 150. These instruments usually have embedded options or other features that give them price convexity; that is, their values are not straight line functions of an underlying price variable 160.

Referring to these groups of primary and derivative instruments with values that are related by the linkages in the price behavior of underlying positions as an "arbitrage complex" should not be seen as an implication that there are large arbitrage profits waiting for any reasonably skilled investor. The use of the term arbitrage complex means only that price relationships are constrained to varying degrees by the ability of investors to take similar risk positions in more than one way. At times there may be arbitrage profit opportunities available to large trading desks that can operate effectively in a wide range of markets. However, the profit on an individual transaction of this nature usually will be modest relative to the capital required to support the trading desk because price disparities are constrained by arbitrage forces.

The classic definition of arbitrage is the action of purchasing a commodity or security in one market for immediate sale in another market. This is commonly called deterministic arbitrage. Popular usage has expanded the meaning of arbitrage to include any attempt to buy a relatively underpriced item and sell a similar, relatively overpriced item, expecting to profit when the prices resume a more appropriate theoretical or historical relationship. This is typically called statistical arbitrage and it describes the arbitrage relationship found in the markets under discussion. (After Gastineau and Kritzman, *The Dictionary of Financial Risk Management*, 1999, p. 22).

Relationships Among the Components of an Index (or Basket) Arbitrage Complex

Theoretical and actual price relationships among the various components of an index arbitrage complex may not be precisely determined because different components track or relate to the index in different ways and because the components are used under different circumstances by different market participants with different resources, different tax situations and different objectives. Among the factors affecting how well various instruments and baskets track the index are product and market structures and the flexibility of market participants. Improving structure and information access and reducing trading costs can increase the usefulness of a product and increase its trading volume and its assets or open interest.

At the core of every index arbitrage complex is the index or basket. Some indexes have been developed by market practitioners for specific, limited purposes and the rules for their compilation and calculation may be casual. For example, the Dow Jones Industrial Average began as the simple sum of the prices of the 12 original companies' shares, divided by 12. See Prestbo (1999) p. 23. As markets have evolved, new indexes have been developed and maintained under rules established by market participants or by index publishers. An index is used to describe and represent the market it reflects in a specific way, even if the index was developed to reflect characteristics of components that were already familiar to market participants before the index appeared. An index publisher maintains varying degrees of control over use of the index as a template for financial products. Financial instruments may be based on actual portfolios that track the index with varying degrees of precision or on index values calculated by or for the index publisher. A financial instrument linked to an index may consist of a portfolio of index constituents assembled by an independent party, sometimes an intellectual property licensee of the index publisher. The portfolio performance may not match the index performance very well in some cases.

The composition of an index portfolio will rarely match the composition of the index perfectly. As an illustration of the obstacles to perfect replication of an index with real portfolios, it is useful to consider the construction of two popular equity indexes. Equity indexes can be replicated or their performance tracked with varying degrees of precision by portfolios and by other components of the arbitrage complex. For example, an index fund based on the Dow Jones Industrial Average (DJIA) can be constructed very simply and very precisely in units equal in value to the sum of the share prices of each of the 30 index components. The minimum "perfect" replication of the DJIA is 1 share of each stock in the index. At the market close on Mar. 31, 2010, the value of one share of each of the 30 DJIA constituent stocks was $1,436.54. A DJIA portfolio could have been constructed at that market close to replicate the index exactly at any integer multiple of $1,436.54 without resorting to fractional shares or other devices. In contrast, the 500 companies in the S&P 500 index are weighted by their float-adjusted market capitalizations. S&P publishes data on the index composition and has rules that describe the weighting of each component to a specified number of decimal places. No actual portfolio of whole shares of stocks will exactly match the published index return calculated by the index publisher. As a practical matter, reasonably close (but not exact) replication of the S&P 500 weightings using whole shares requires a portfolio worth at least several million dollars.

Fund managers adopt a variety of approaches to constructing portfolios based on indexes that have a large number of positions (or that have some illiquid positions), often using a portfolio basket that does not attempt to hold all components of the index at their approximate index weighting. Illiquid positions are often not included in the basket or are underweighted. More liquid positions might be increased or decreased in an attempt to track the nominal index by adjusting factor weightings. Sometimes a financial instrument not in the index will be added to the portfolio. Some of these portfolios track the index closely and some do not. Two or more funds based on the same index but offered by different issuers may trade side by side or in different markets (say in the United States, the United Kingdom and China) yet provide very different returns before (and after) expenses. The degree to which a fund return matches the index return may or may not be of concern to all users of an arbitrage complex's instruments, but it is often necessary to consider the effect of price and value relationships among the various index arbitrage components. In some cases the market price of an ETF or an arbitrage complex derivative may differ from the underlying value of the instrument's elements. Index futures contracts tend to track the cash market index very closely. (Adjustments for alternative position carrying costs and benefits, taxes and expected dividends or other distributions may affect the closeness of index tracking.) Close tracking of a futures contract based directly on the index is possible because the index futures contract is usually priced off the theoretical index with its fractional shares and precise weights. Of course, the futures markets have their own price discovery process and futures market bid and offer dynamics can lead to differences in pricing relationships over the trading day and from day to day. In contrast to index futures, exchange-traded index funds replicate the composition of their template index to widely varying degrees of precision. Consequently, hedging ETF positions and using ETFs as hedging instruments may affect price relationships among various components of the index arbitrage complex in a different way than futures contracts. For a variety of reasons (e.g. high trading costs for some index components, regulated investment company (RIC) diversification requirements, operating expenses and laziness of the fund portfolio manager in failing to put the fund's cash to work) index fund performance may not closely replicate theoretical index performance.

The principal subject of the present application is the Securities Futures Product (hereafter generally referred to as SFPs or an SFP). Securities Futures Products are futures contracts regulated jointly by the Securities and Exchange Commission and the Commodity Futures Trading Commission in the United States. There are a variety of underlying financial instruments and indexes for these contracts. This discussion applies to all SFPs on underlying financial instruments and indexes for which a net asset value or some other specified value is periodically calculated or determined, including but not limited to some or all Common and Preferred Stocks, American Depository Receipts (ADRs), Closed End Funds (CEFs), Exchange Traded Funds (ETFs), Indexes, Limited Partnerships, Structured Notes, Trust Issued Receipts, Unit Investment Trusts, and Other Securities and Financial Contracts. SFPs are popularly referred to as "Single Stock Futures" or SSFs, even if the underlying is not a common or preferred stock. One Chicago, the principal exchange that trades Securities Futures Products in the U.S., refers to its products in most of its literature as Single Stock Futures, regardless of the underlying. In the balance of this specification, the terms Securities Futures Product (SFP) and Single Stock Futures (SSF) are used interchangeably with the exception of the claims where the more formal term, Securities Futures Product or SFP, is used exclusively.

Prices of SFP or SSF contracts on an ETF may depart further from the index than the prices of the ETF depart from the index because, in addition to imprecision in index replication in the ETF portfolio, the price/value of the SSF contract reflects supply and demand in the securities lending market for the ETF's shares and financing and tax costs and benefits in both securities and SSF markets. The prices of options on any of the arbitrage complex components will reflect not only variations in the composition of the option's specific underlying but differing expectations for the volatility of the underlying and different financing and tax costs and benefits for different market participants. Traders using various instruments in the index arbitrage complex evaluate the desirability of transactions and select positions subject to their idiosyncratic objectives and constraints. An important objective of most market participants is usually to take a position with the most favorable combination of economic terms possible.

Some index arbitrage complex instruments 210 are compared in terms of the closeness of their linkage to the underlying index 220 in FIG. 2. No attempt was made to list all possible or relevant instruments in the table; the absence of options on the cash value of the index is an obvious omission.

The financial instrument with the closest return linkage to the index that is on the list is the index futures contract. At the time the terms for settlement of the index futures contract are fully determined, the value of the settlement is a simple function of the value of the index. Options on the index futures contract are an additional step removed. Options bring the additional element of volatility in the underlying basket price into the value determination mix. Furthermore, if the options settle into the futures contract, the linkage after the option settlement is equal to the futures linkage for the remaining life of the futures position. The return on an ETF based on the template index is usually at a greater remove from the index than the futures contract because its portfolio does not precisely replicate the index for some of the reasons described above. In addition to the fact that ETFs hold portfolios that differ to varying degrees from the composition of the index, options on ETFs introduce a volatility element on top of the difference in composition between the ETF and the index. In practice, the relationships will not be as simple or as consistent as the discussion of the instruments listed in FIG. 2 might suggest, but most deviations in price relationships can be explained by one or more of:

Financing costs or benefits,
Volatility expectations,
Basket composition differences,
Tax considerations
Securities lending terms, or
Other reasons for differences in supply or demand in the related markets.

The most significant determinant of the deviation between the "price" of a futures contract and its underlying is usually the basis of the contract. In this context, basis is usually defined as "The difference between the forward price . . . and the spot price . . . ." In the case of an SSF contract, the basis reflects "the cost minus the benefit of holding (the position) until the forward or futures settlement date." [After Gastineau and Kritzman (1999) p. 32.] A standard value for the basis of a futures contract is often calculated by a futures exchange or a service provider working for the exchange and disseminated to the market for use by market participants. The elements of the calculation of future value and basis are described below. A standard value for the basis may be calculated each day and used by traders in developing bids and offers for an SSF contract. In addition to standard SSF contracts, NoDiv SSF contracts may be used to remove dividend risk and simplify calculation of the basis. At the bottom of FIG. 2, the link that, aside from the effect of volatility, is the least fully determined is the link between the index and the single stock futures contract on an ETF. The single stock futures on ETFs are less closely linked to the instruments above them on the list because different market participants evaluate a long or short position in the SSF market in different ways, making the price of a single stock futures transaction indeterminate within a range. It is possible to carry this example further by considering options on single stock futures on the ETFs, but the principle of more or less progressively weaker linkage is clear. The point of the list is not that there will always be a strict weakening of linkage to the index in the order suggested in FIG. 2. The purpose of FIG. 2 is to illustrate a general pattern, not relationships that will be identical in every case.

Another purpose of FIG. 2 is to suggest the usefulness of a market that permits investors to trade at or relative to specific value calculations for one of the arbitrage complex components. Trading relative to a value relationship lets investors manage their risks and trading costs more effectively than if they are compelled to trade in a market that may not reflect their perspective on an instrument's value relative to other arbitrage complex components appropriately. NAV-based trading or trading variations based on another contingent value relationship can be useful to investors using markets in instruments less closely linked (1) to the underlying index or (2) to a derivative higher or lower on the list than the instrument they are trading.

NAV-based trading is most obviously useful in trading ETFs that do not track a major benchmark index. Its advantages are described more fully in the specifications of U.S. Pat. Nos. 7,444,300 and 7,496,531 and in Gastineau (2010), Chapter 8. Correspondingly, the weaker the arbitrage linkage between ETF single stock futures contracts and the index, the greater the value investors may place on a trading mechanism that lets them trade at or relative to a more relevant contingent value for the instrument that they are using. Typically, the contingent value will not yet be determined or, if determined, may not be known at the time of the subject transaction.

NAV-based trading is expected to be introduced to U.S. ETF investors in 2011 and should soon prove its value to users of ETFs. Similar contingent trading variations using other valuation relationships may be useful to traders in options on various arbitrage complex components and to traders in single stock futures on ETFs. The examples discussed herein are based on the market for SSFs on ETFs, though it should be recognized that embodiments of the present invention are not limited thereto.

Trading Single Stock Futures Contracts on ETFs at or Relative to a Contingent Value-Based Calculation The basic structure of an end-of-day NAV-based market for ETFs is relatively straightforward. In contrast, value-linked markets for single stock futures on ETFs can take several forms. Conventional trading in ETFs takes place in a market where bids and offers are entered as market orders or as limit orders for execution at a currency denominated price rather than as orders contingent on a net asset value or other value calculation. Markets for single stock futures contracts on ETFs now use (primarily) market orders or limit orders stating a currency denominated price for the SSF contract. Limit orders are stated in terms of a price for the futures contract rather than to an underlying value, such as a value or price of the ETF. Just as net asset value-based trading of ETFs serves the needs of a number of ETF market participants better than the conventional intraday ETF market, similar contingent value trading of single stock futures on ETFs linked to the value of the ETF can increase the usefulness of these instruments with their weaker price linkage to the template index than the ETF itself, particularly if the new markets reduce transaction costs and increase trading volumes by attracting investors who will find the single stock futures contract structure more useful, because they can control their costs of trading with NAV or closing price based orders.

Variations on NAV-Based Trading for Single Stock Futures Contracts on ETFs

Trading in ETF markets in the United States is heavily concentrated in the shares of less than 10% of all funds. The number, but not the percentage, of very actively traded funds will probably grow slowly as the market matures. Trading in single stock futures contracts on ETFs is even more concentrated (and much less active, especially if SSF contracts on the SPDR® S&P 500® ETF (Standard & Poor's Financial Services LLC, New York, N.Y.) and the PowerShares QQQ Index Tracking Trust$^{SM}$ (Invesco Holding Company Limited, Atlanta, Ga.) are excluded). The use of a variant on NAV-based trading to control and reduce trading costs by concentrating trading on ETF SSFs around a contingent end-of-day value can increase trading volume and investor utility in those derivative markets by reducing bid/asked spreads and bringing market participants together on a level trading field. Because these alternative methods of trading can be implemented in a number of ways, describing preferred implementations for illustrative purposes seems a sensible starting point, although this method of trading can be implemented in a number of additional ways within the scope of the invention.

Trading in SSF markets has not been very active because of (1) wide bid/asked spreads, (2) limited investor understanding of these contracts, and (3) even less understanding of how investors can use single stock futures contracts to earn consistently higher returns than they can obtain from comparable long or short positions in the underlying ETFs. To illustrate some key relevant features in evaluating the attractiveness of the single stock futures markets, we begin with an equation often used for SSF trade evaluation. Because the single stock futures contracts that have been and seem likely to continue to be most actively traded are SSFs on ETFs, the discussion is based on ETFs, but the closing price or a calculated value of some other instrument(s), including common stocks, can be readily substituted for the ETF NAV in the trading at or relative to a specified valuation discussion that follows.

In most practitioner discussions of SSFs the transaction "target" or reference price for an investor is the fair or forward value of the contemporary price or—in the case of an ETF—the fair or forward value of the intraday or end-of-day net asset value of the ETF. It is important in examining these fair value calculations to remember that positions in SSFs can be collateralized by a wide range of financial instruments; hence the investor ties up no cash to earn a return on the SSF. The following equation expresses the SSF end-of-day fair or forward value as it is usually calculated and disseminated:

$$\text{SSF Forward Value} = (\text{Days End Stock Price or ETF NAV}) * e^{r*((t_x - t_0)/360)} - \text{Div} * e^{r*((t_x - t_d)/360)}$$

In this equation r is an appropriate short term rate of interest for discounting cash flows over the life of the SSF contract back to the present. $t_0$ is the current or evaluation day. $t_x$ is the expiration day of the SSF contract. $t_d$ is the date of a dividend payment expected before $t_x$. The annualization day count factor is, by convention, 360 or 365 depending on the rate used in discounting. The present value of any dividend (Div) expected to be paid during the life of the SSF contract is subtracted in the second term of this (slightly simplified) valuation equation.

The interest rate typically used in published versions of this valuation equation is the federal funds rate and the day count is usually 360. A more appropriate rate adjustment for a longer term contract might use rates derived from the Treasury yield curve or some other source, on the assumption that the investor is evaluating the SSF position relative to a direct holding in the ETF over the life of the SSF contract. The appropriate interest calculation for different investors and different circumstances may vary.

If the dividend estimate published by or for the SSF exchange is not adequate, a third party service could publish a valuation based on an alternative dividend estimate. At least two major financial data providers calculate and publish credible stock, index and ETF dividend forecasts and NoDiv SSF contracts which eliminate dividend risk are available.

The forward value calculation is pertinent to evaluation of an SSF position relative to taking a position directly in the ETF because, as noted, an SSF investor does not have to make a cash deposit or pay interest on margin debt to hold a single stock futures contract to maturity. The difference between the forward value and the cash price is (1) the interest-based carrying cost and (2) the present value of any dividends. These two elements combine to determine the basis of most SSF contracts. Setting aside dividends for a moment, the absence of a cash cost to carry the long SSF position and the opportunity to take a short-equivalent position more efficiently with the SSF means that the long SSF investor can pay a higher nominal price (subject to any dividend adjustment) for the SSF contract than the current price of the underlying and still be better off because the return on the collateral belongs to him, as does any return net of the value of any dividends paid during the life of the SSF contract. Differences in appropriate interest rate assumptions for different market participants offer scope for data offerings from a variety of information providers and a plurality of conventions for pricing and quoting in contingent value markets. In contrast to the interest rate effect, dividend payments by a stock or ETF will reduce the forward value of the standard SSF contract, making dividend payments a significant component of the basis of some SSF contracts. Differences in interest rate impact and dividend forecasts suggest that some market participants may prefer to make independent basis analyses and incorporate their own basis estimates into their bids and offers, whatever basis information might be published.

A basis adjustment for the forward value equation or some variant of it can be incorporated into the ETF SSF trading process in several ways. The basic decisions to be made are: (1) should an adjustment to net asset value reflecting the expected future value of the underlying financial instrument be incorporated into the trading mechanism or left to each market participant; and (2) if an adjustment is incorporated should it use the existing supplemental information on forward value published by or for the trading market or should more sophisticated future value adjustments be developed?

The fine points of the implementation conventions are best determined by the trading market at the time the trading mechanism is introduced. In any event, the nature of the relationship between an ETF net asset value calculation and the execution price of the SSF contract should be clear to all parties and information on the calculations and conventions should be readily available to all market participants. Experience suggests that markets often prefer to delegate the calculation of such information to third parties. In one particular implementation, supplementary future value information incorporating a dividend forecast may be provided by such a party. In another particular implementation (for NoDiv contracts) the supplementary basis information will incorporate only an interest calculation. Market participants who do not agree with any published estimate of the difference between the future value and the present value can adjust their bids or offers to reflect differences between their estimates and the published estimates. Investors or advisors serving investors may make their own interest and dividend calculations before adjusting their orders relative to a specific day's NAV calculation to reflect their proprietary evaluations. The preferred value determinant for value-based trading of SSFs on common stocks is the closing price of the stock. Trading at or relative to a value that will be determined by tomorrow's net asset value, particularly in SSFs on ETFs holding portfolios of foreign securities, may be possible and may be attractive to many investors who are willing to accept the market's determination of the appropriate value, so long as they can control their transaction costs relative to that value.

Special Trading Opportunities in SSF Contracts on ETFs

To illustrate the nature of some of the pricing relationships that can make holding a position in an SSF contract attractive relative to a position in the underlying shares, consider the example in FIG. 3.

The table in FIG. 3 illustrates, in a very rudimentary way, an important difference in the comparative economics of trading in the ETF itself in the securities market and trading in SSF ETF markets. The top part of FIG. 3 illustrates a securities market transaction in ETF shares where the "long" buys an S&P 500 SPDR share (ticker symbol SPY) at $110 and sells it 61 days later for $110, incurring neither a profit nor a loss. The "short" similarly sells the SPDR share at $110 and buys it back for $110 at the end of the 61-day period. The short seller's broker will have to arrange to borrow the share to facilitate the short sale, a process that usually includes a number of manual steps and is not economically practical unless the transaction is significantly larger than this one. The broker would be compensated for arranging this securities loan, but typically the retail short seller will not share in this compensation. In this simple transaction covering a period without a dividend, both parties lose any commissions they paid and the long loses the use of his cash for 61 days. The short seller loses only a commission, but he ties up collateral for the term of the transaction.

Although a single stock futures contract usually covers 100 or 1000 shares of the underlying ETF, the SSF example in the lower half of FIG. 3 is based on the equivalent of a single share, to keep the calculations comparing a transaction in the ETF share to the single stock future as simple as possible and to keep the numbers as small as possible. In the case of the single stock futures transaction in the lower section of FIG. 3, we change the opening price to reflect at least part of the interest rate adjustment and the closing price to illustrate how both parties can earn a profit relative to the share trade in the top part of the table. In this case we assume a single share stock futures contract on the SPDR trades at $111 at the beginning of the 61-day period. The long investor buys it at $111 and sells it at $110.50 at the end of the period for a $0.50 loss. However, relative to the long investor in the securities market at the top of the table, she earns interest on the $110 in cash that she would otherwise have invested in a SPDR share. At a rate of interest of approximately 6 percent for 61 days, the interest would be about $1.00, giving her a net profit of about $0.50 per underlying share (relative to the share transaction) before any commission.

The seller, on the other hand, sells a SPDR single share single stock futures contract at $111. He buys it back 61 days later at $110.50 for a $0.50 profit. In this example both parties have earned a profit relative to a comparable equity market transaction before commissions. The reason for the difference in the two outcomes is that any interest on the proceeds of the short sale in the securities market belongs to the parties handling the securities lending transaction. Delinking the transaction from the securities lending markets leaves open an opportunity for parties on both sides of the position to earn a superior pre-tax return in the SSF market. Baldwin (2010a and 2010b) illustrates some of these points from a different perspective and describes some possible tax advantages that have attracted attention to SSF contracts.

The limited liquidity and wide bid/asked spreads in today's single stock futures market do not allow investors to use these contracts effectively to side-step the costs and inconvenience of securities lending. If investors can use NAV-based trading supported by appropriate calculations of future value in SSF markets, these markets will be a great deal more active and the relative economics of trading and holding ETF positions and ETF single stock futures positions will change for many participants. (A full discussion of margin requirements for using single stock futures is unnecessary for present purposes; but the SSF margin deposit can be, for example, any of a wide range of securities positions that serve to guarantee the investor's performance. There is no cash variation margin flowing between accounts as position values rise and fall. The collateral posted cannot be used for other purposes while the SSF position is open, but there are no interest charges or credits and no cash flows until the SSF position is closed out.) Trading prices in the new market will approximately reflect the respective value of the cash market analog adjusted to reflect the future value of the SSF contract.

The simple comparison of the positions illustrated in the top and bottom segments of FIG. 3 shows important advantages of the single stock futures market under several circumstances. This variant of the NAV-based trading process will concentrate the liquidity in SSF trading on a single contingent value, reducing the bid/asked spreads and making the SSF market an attractive venue for investors who want to take positions in ETFs more efficiently for periods of a few months up to a year or more. More information on the current market for single stock futures is available at www.onechicago.com. The available information includes discussions of economics, valuation and NoDiv contracts.

Just as information on intraday values and other topics is disseminated in the market for conventional trading of ETFs, information will be available to support NAV-based trading in indexed and actively managed ETFs and in SSFs on all types of ETFs for which SSFs are offered. In addition to the currently available future value information, additional interest rate information and, possibly, additional dividend and other information may be disseminated to support NAV-based trading in single stock futures on ETFs. One preferred implementation will publish the value or return enhancement available to a retail purchaser using the SSF contract as a substitute for a long position in the ETF shares. Another preferred implementation will show the enhanced value to a short seller who finds the short position in the ETF SSF contract attractive because he is, in effect, able to sell the stock short without any of the costs associated with borrowing securities—including payment of some of the proceeds from interest earned on the proceeds of the short sale to a securities lender. Of course, the pricing of the SSF contracts will usually reflect sharing of these economic advantages between the long and the short.

Organizing and informing trading in SSF contracts on ETFs will support NAV-based trading by concentrating liquidity at the daily market close. The SSF exchange or a service provider may distribute calculations of the forward value to buyers and, perhaps, appropriate additional calculations and information for SSF sellers. Adjustments to the currently disseminated forward value to serve the special needs of either long or short investors can be readily calculated by a variety of service providers. Such adjustments might include the use of term interest rates and special information on financing terms for various types of market participants.

Figure 4:
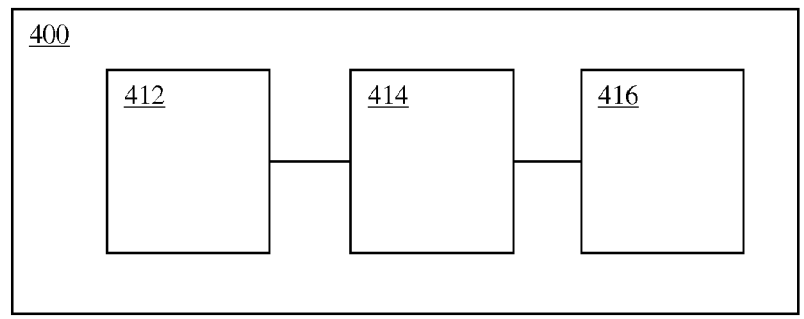
FIG. 4 is a block diagram of an exemplary embodiment of a system of the present invention.

Turning now to FIG. 4, aspects of an exemplary embodiment will be described in detail. As shown, a system 400 includes a first module 412 configured to execute a trade of a securities futures product on an underlying financial instrument for which a valuation relative to at least one of (a) a net asset value and (b) a closing price, is calculated and published at or after a specified time.

In particular embodiments, first module 412 may be configured to receive an order to buy or sell the securities futures product; and to match the received order with a complementary sell or buy order to trade the securities futures product relative to at least one of (1) the valuation and (2) the valuation with a basis adjustment. Moreover, a format of the order to trade the securities futures product may include at least one of (i) a root trading symbol for the securities futures product; (ii) a root trading symbol for the securities futures product and a FIX code designating both the securities futures product and the trading system; (iii) a root trading symbol for the securities futures product with an extension designating the trading method and (iv) a trading symbol for the securities futures product designating both the securities futures product and the trading system. As a further optional aspect, the first module may be configured to accommodate bids or offers describing a number of securities futures product contracts and at market or at limit prices.

A second module 414 is configured to determine a price for the executed trade, in which the price is specified relative to the valuation or the valuation with a basis adjustment. Moreover, module 414 may be configured to determine a price which is one of (a) a first price which is at a specified discount, (b) a second price which is substantially equal, and (c) a third price which is at a premium, to the valuation or the valuation with a basis adjustment.

In particular embodiments, second module 414 is configured to obtain at least a portion of the basis adjustment from a third party. For example, such basis adjustment/portion may be calculated by or for an organized market for trading the securities futures products. Alternatively, it may be calculated by an industry utility or a data service provider. Still further, module 414 may be configured to enable market participants to incorporate substantially any basis adjustment into their bids or offers. In as yet another optional variation, the second module may be configured to at least one of (a) compute the valuation at or after the specified time, (b) compute the valuation with a basis adjustment at or after the specified time, (c) receive the valuation at or after the specified time, and (d) deliver the valuation at or after the specified time.

A third module 416 is configured to submit the executed trade for settlement at the determined price. Moreover, in particular embodiments, the specified time is at or relative to a closing time for an exchange.

It should be recognized that the financial instrument underlying the futures product associated with system 410 may be any one or more of (i) a share of a general class of shares of an investment fund, (ii) a share of a specialized share class of an investment fund, (iii) a share of an exchange-traded fund, (iv) a share of a grantor trust, (v) a unit of an exchange-traded note, and (vi) a security.

Figure 5:
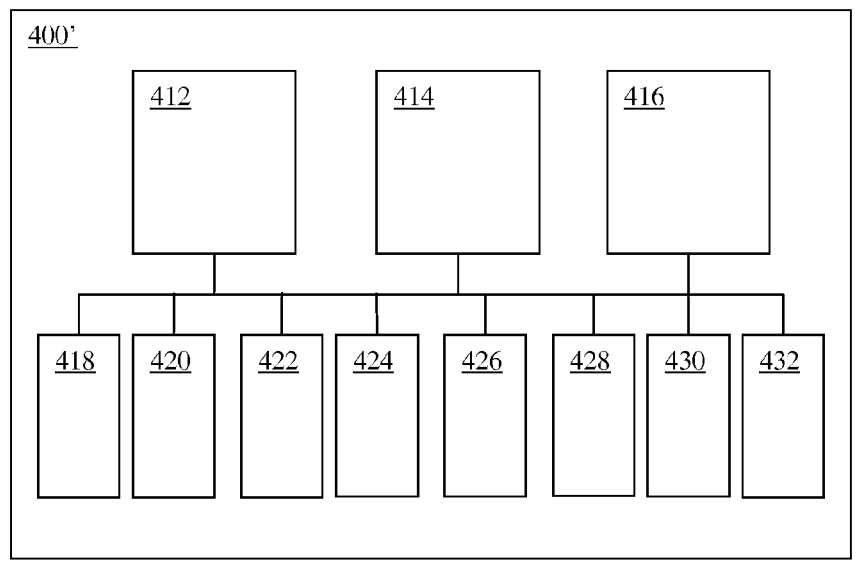
FIG. 5 is a view similar to that of FIG. 4, of an alternate embodiment of the present invention.

Turning now to FIG. 5, an alternate embodiment shown as system 400' includes modules 414-416 substantially as described hereinabove, along with any one or more of optional modules 418, 420, 422, 424, 426, 428, 430 and 432 which will now be described. A standardization module 418 is configured to determine a standardized calculation of the difference between the current valuation and the calculated forward or future value of the underlying financial instrument based on a model incorporating at least one of (a) an interest rate and (b) a dividend forecast. A data module 420 is configured to provide at least one of (a) the interest rate, (b) the dividend forecast and (c) the basis adjustment (or portion thereof) as designated by an exchange or a service provider engaged by an exchange.

A proxy module 422 may be used, which is configured to accommodate an arbitrary proxy for the valuation (or valuation with a basis adjustment), e.g., as used by second module 414. The proxy serves as an anchor point for the determined price, with any difference between the proxy and the anchor point translated into currency terms according to rules specified for the market. In particular embodiments, the proxy module is configured to set an arbitrary proxy anchor point at a specific number, in which a trade made at the specific number will be at the second price; a trade made below the specific number will be at the first price, and a trade made above the specific number will be at the third price. Any difference between the proxy and the anchor point may be measured in currency to a precision determined by rules of a market.

A net asset value module 424 may also be used, which is configured to compute the net asset value at a specified time such as, for example, from a session opening transaction in each position in a portfolio of an investment fund. As a further option, a report module 426 may be used, which is configured to report and/or deliver information on the executed trade to at least one of (i) a party to said executed trade, (ii) a market data reporting system, (iii) a broker or dealer, (iv) an industry utility, (v) a market data vendor, (vi) an industry service organization, (vii) a market participant, and/or (viii) financial media.

An optional information module 428 may be configured to receive information on the executed trade from at least one of (i) a party to the executed trade, (ii) a market data reporting system, (iii) a broker or dealer, (iv) an industry utility, (v) a market data vendor, (vi) an industry service organization, (vii) a market participant, and (viii) financial media.

An optional error correction module 430 may be used, which is configured to retroactively modify terms of the executed trade upon correction of an error.

Still further, any of the above-described embodiments may include a graphical user interface module 432 configured to at least one of (i) enable a user to enter a buy or sell order to trade the securities futures product on a graphical user interface, (ii) display a buy or sell order to trade the securities futures product on a graphical user interface, and (iii) display a buy or sell order to trade the securities futures product on a computer display.

Having described various embodiments of the inventive system of the present invention, various exemplary methods in accordance with the present invention will now be described with reference to the following Tables I and II.

As shown in Table I, an exemplary computer-based method 500 is provided for trading an exchange-listed securities futures product (SFP) on an underlying financial instrument for which a valuation equal to at least one of (a) a net asset value and (b) a closing price can be calculated, with such trading conducted on or away from an exchange. The method includes executing 502 a trade of an SFP for which a valuation equal to at least one of a net asset value and a closing price is calculated and published at or after a specified time. At 504, a price is determined for the executed trade, from a set of prices that are specified relative to at least one of (i) said valuation and (ii) said valuation with a basis adjustment. The set of prices include (a) a first price that is at a specified discount to, (b) a second price that is at, and (c) a third price that is at a premium to, at least one of (i) the valuation and (ii) the valuation with a basis adjustment. At 506, the executed trade is submitted for settlement at the determined price.

TABLE I

Method 500

| | |
|---|---|
| 502 | executing a trade of an SFP for which a valuation equal to at least one of a net asset value and a closing price is calculated and published at or after a specified time. |
| 504 | determining a price of the executed trade at (a) a first price at a specified discount to, (b) a second price that is at, or (c) a third price that is at a premium to, at least one of (i) the valuation and (ii) the valuation with a basis adjustment. |
| 506 | submitting said executed trade for settlement at said determined price. |

Various optional aspects of method 500 are shown and described with respect to Table II. It should be recognized that any one or more of these optional aspects may be used in any number of combinations in various embodiments of the present invention. At 510, the specified time may be selected to be at or relative to a closing time for an exchange. At 512, the basis adjustment may be determined by a standardized calculation of the difference between the current valuation and the calculated forward or future value of the underlying financial instrument, based on a model incorporating at least one of (a) an interest rate and (b) a dividend forecast. At 514, the interest rate, dividend forecast, and/or basis adjustment may be published by an exchange or a service provider engaged by an exchange. At 516, at least a portion of the basis adjustment is calculated by or for an organized market for trading the securities futures products or by an industry utility or data service provider. At 520, market participants may incorporate substantially any desired basis adjustment into their bids and offers. At 522, the underlying financial instrument may be at least one of (i) a share of a general class of shares of an investment fund, (ii) a share of a specialized share class of an investment fund, (iii) a share of an exchange-traded fund, (iv) a share of a grantor trust, (v) a unit of an exchange-traded note and (vi) a security.

Additional optional aspects may include using 524, an arbitrary proxy for the valuation or for the valuation with basis adjustment, so that the proxy serves as an anchor point for the determined price. Any difference between the proxy and the anchor point may be translated into currency terms according to rules specified for the market. At 526, the arbitrary proxy anchor point may be set at a specific number. A trade made at, below, or above the specific number will be priced at the second, first, and third prices, respectively. Any difference from the anchor point may be measured in currency to a precision determined by rules of a market.

At 528, exemplary methods may include receiving an order to buy or sell the securities futures product, and matching the received order with a complementary sell or buy order to trade the securities futures product relative to the valuation and/or the valuation with a basis adjustment. In a variation of 528, the order to trade the securities futures product may be formatted 530 to include at least one of (i) a root trading symbol for the securities futures product; (ii) a root trading symbol for the securities futures product and a FIX code designating both the securities futures product and the trading method; (iii) a root trading symbol for the securities futures product with an extension designating the trading method and (iv) a trading symbol for the securities futures product designating both the securities futures product and the trading method. Still further, the executing may accommodate 532 bids or offers describing a number of securities futures product contracts at market or at limit prices.

As yet further options, the foregoing methods may, at 534, include at least one of computing the valuation, computing the valuation with a basis adjustment, receiving the valuation, and delivering the valuation, at or after the specified time. The net asset value may be computed 536 from a session opening transaction in each position in a portfolio of an investment fund. Information regarding the executed trade may be reported and/or delivered 540 to one or more of (i) a party to the executed trade, (ii) a market data reporting system, (iii) a broker or dealer, (iv) an industry utility, (v) a market data vendor, (vi) an industry service organization, (vii) a market participant, and (viii) financial media. Similarly, such information may be received 542 by any of (i)-(viii) of 540. In addition, the various methods may include retroactively modifying 544 terms of the executed trade upon correction of an error. Moreover, a graphical user interface module may be used 546 to enable a user to enter a buy or sell order to trade the securities futures product, and/or display the buy or sell order.

TABLE II

Optional Methodology

| | |
|---|---|
| 510 | select specified time at or relative to a closing time for an exchange. |
| 512 | basis adjustment is determined by a standardized calculation of the difference between the current valuation and the calculated forward or future value of the underlying financial instrument based |

TABLE II-continued

Optional Methodology

| | |
|---|---|
| | on a model incorporating an interest rate and/or dividend forecast. |
| 514 | the interest rate, dividend forecast, and/or basis adjustment is published by an exchange or a service provider. |
| 516 | at least a portion of the basis adjustment is calculated by or for an organized market or by an industry utility or a data service provider. |
| 520 | market participants may incorporate basis adjustment into their bids and offers. |
| 522 | the underlying financial instrument may be a share of a general class of shares of an investment fund, a share of a specialized share class of an investment fund, a share of an exchange-traded fund, a share of a grantor trust, a unit of an exchange-traded note, and/or a security. |
| 524 | using an arbitrary proxy for the valuation or valuation with basis adjustment. |
| 526 | setting the arbitrary proxy anchor point at a specific number, so that a trade made at, below, or above the specific number will be priced at the second, first, and third prices, respectively. |
| 528 | receiving an order to buy or sell the securities futures product and matching with a complementary sell or buy order to trade the securities futures product relative to the valuation or the valuation with a basis adjustment. |
| 530 | optionally formatting the order to include at least one of (i) a root trading symbol; (ii) a root trading symbol and a FIX code; (iii) a root trading symbol with an extension designating the trading method and (iv) a trading symbol designating both the securities futures product and the trading method. |
| 532 | accommodate bids or offers describing a number of securities futures product contracts at market or limit prices. |
| 534 | at least one of computing the valuation, computing the valuation with a basis adjustment, receiving the valuation, and delivering the valuation, at or after the specified time |
| 536 | computing the net asset value from a session opening transaction. |
| 540 | reporting and/or delivering information on the executed trade to (i) a party to the executed trade, (ii) a market data reporting system, (iii) a broker or dealer, (iv) an industry utility, (v) a market data vendor, (vi) an industry service organization, (vii) a market participant, and (viii) financial media. |
| 542 | receiving the information by any of (i)-(viii) of 140. |
| 544 | retroactively modifying terms of the executed trade upon correction of an error. |
| 546 | enabling (i) entry of a buy or sell order to trade said securities futures product on a graphical user interface, (ii) display of a buy or sell order to trade said securities futures product on a graphical user interface, and (iii) display of a buy or sell order to trade said securities futures product on a computer display. |

Figure 6:
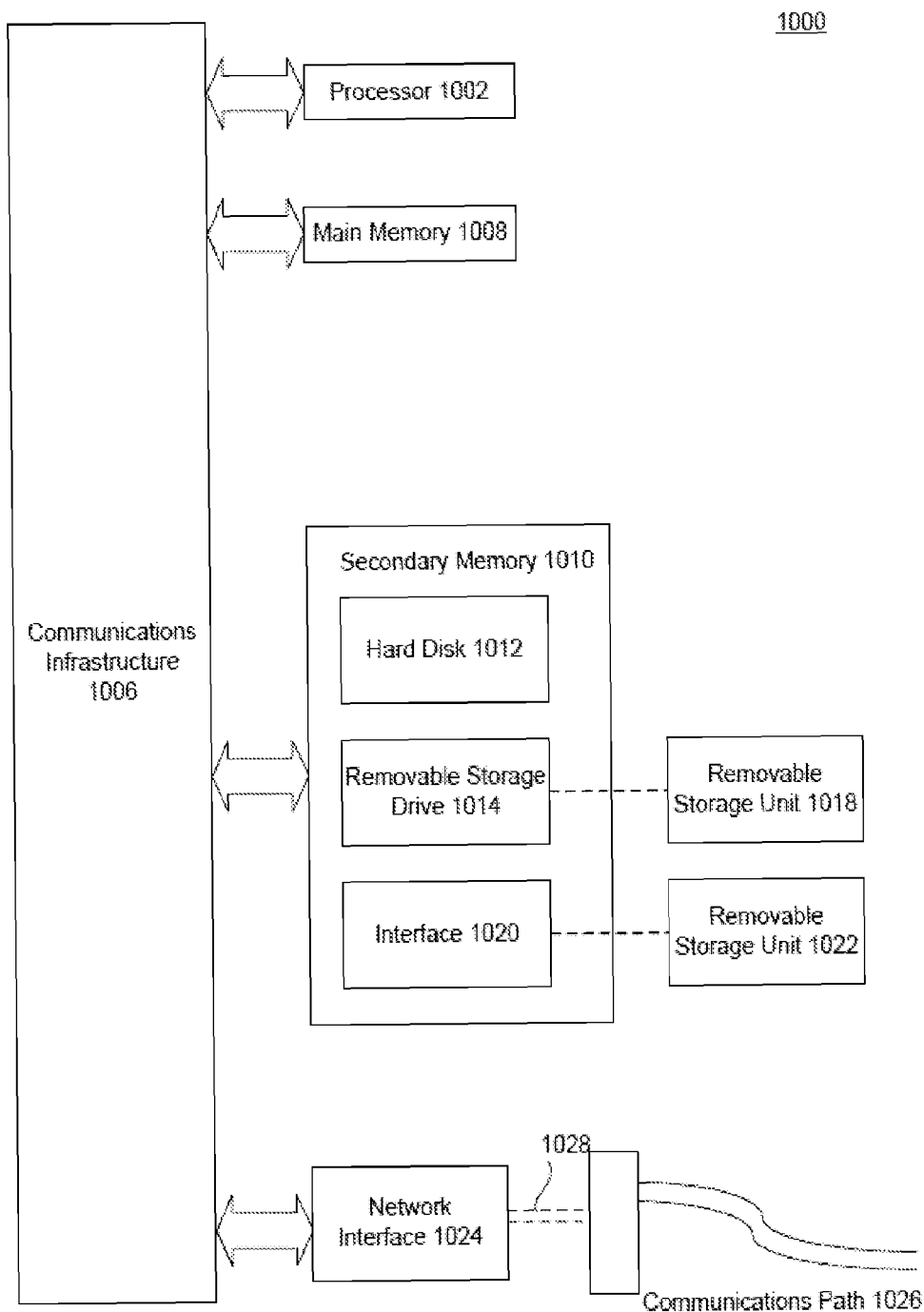
FIG. 6 is a block diagram of an exemplary computer connected to a network upon which the exemplary methods and systems of the present invention may be implemented.

FIG. 6 is a diagram of an exemplary computer system 1000 upon which embodiments of the present invention (or components thereof) may be implemented. The exemplary computer system 1000 includes one or more processors, such as processor 1002. The processor 1002 is connected to a communication infrastructure 1006, such as a bus or network. Various software implementations are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may include a secondary memory 1010. The secondary memory 1010 may include, for example, a hard disk drive 1012 and/or a removable storage drive 1014, representing a magnetic tape drive, an optical disk drive, etc. The removable storage drive 1014 reads from and/or writes to a removable storage unit 1018 in a well-known manner. Removable storage unit 1018 represents a magnetic tape, optical disk, or other storage medium that is read by and written to by removable storage drive 1014. As will be appreciated, the removable storage unit 1018 can include a computer usable storage medium having stored therein computer software and/or data.

In alternative implementations, secondary memory 1010 may include other means for allowing computer programs or other instructions to be loaded into computer system 1000. Such means may include, for example, a removable storage unit 1022 and an interface 1020. An example of such means may include a removable memory chip (such as an EPROM, or PROM) and associated socket, or other removable storage units 1022 and interfaces 1020, such as a memory stick or memory card, which allow software and data to be transferred from the removable storage unit 1022 to computer system 1000.

Computer system 1000 may also include one or more communications interfaces, such as communications interface 1024. Communications interface 1024 allows software and data to be transferred between computer system 1000 and external devices. Examples of communications interface 1024 may include a modem, a network interface (such as an Ethernet card), a communications port, a WIFI interface, a Bluetooth interface, a cellular interface, a PCMCIA slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a wireless link and other communications channels. In an embodiment of the invention, signals 1028 comprise carrier waves modulated with control logic.

Any apparatus or manufacture comprising a computer useable or readable medium having control logic (software) stored therein is referred to herein as a computer program product or program storage device. This includes, but is not limited to, the computer 1000, the main memory 1008, the hard disk 1012, the removable storage units 1018, 1022 and the carrier waves modulated with control logic 1028. Such computer program products, having control logic stored therein that, when executed by one or more data processing devices, cause such data processing devices to operate as described herein, represent embodiments of the invention.

CONCLUSION

Embodiments of the present invention are directed to trading Securities Futures Products (SFPs) on financial instruments for which a net asset value or other value such as a closing price is periodically calculated.

Embodiments of the present invention also provide a variety of order types within the framework of a contingent price determination. One such order type variation is an order where a cap or floor on the contingent price is stated as part of the order entry process. Many order types used in securities and futures markets are suitable for use in NAV-based trading or other future value based trading of Securities Futures Products in other embodiments. In one embodiment, the existing symbol could be used in conjunction with a different FIX tag to designate the trading mechanism. Further embodiments of the present invention include systems and methods that use the basic trading symbol of a Securities Futures Product on a financial instrument for which a net asset value or other values can be periodically calculated or such symbol(s) and an extension describing the nature of the execution process. Alternatively, a newly specified symbol could designate both the instrument and the execution process.

It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and tables which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

Having thus described the invention, what is claimed is:

1. A computer-based method for trading an exchange-listed securities futures product (SFP) on an underlying financial instrument for which a valuation equal to a net asset value can be calculated, such trading conducted on a secondary market on or away from an exchange, the method comprising:

executing a trade of said securities futures product, said trade priced on the secondary market as a combination of an adjustment amount known and agreed to by the parties to the trade at the time of the trade, and a base valuation serving as a placeholder for a specific net asset value that will be calculated and published at or after a specified time, wherein a final numerical value will be assigned to said base valuation at or after the specified time;

determining the price of said executed trade from a set of prices that are specified relative to at least one of (i) said base valuation and (ii) said base valuation with a basis adjustment, said set of prices comprising (a) a first price that is at a specified discount to at least one of (i) said base valuation and (ii) said base valuation with a basis adjustment; (b) a second price that is at least one of (i) at said base valuation and (ii) at said base valuation with a basis adjustment; and (c) a third price that is at least one of (i) at a specified premium to said base valuation and (ii) at a specified premium to said base valuation with a basis adjustment;

submitting said executed trade for settlement at said determined price;

said executing including receiving an order to buy or sell said securities futures product; and matching said received order with a complementary sell or buy order to trade said securities futures product relative to at least one of (1) said base valuation and (2) said base valuation with a basis adjustment;

wherein a format of said order to trade said securities futures product comprises at least one of (i) a symbol; (ii) a root trading symbol for said securities futures product; (iii) a root trading symbol for said securities futures product and a FIX code designating both said securities futures product and said trading method; (iv) a root trading symbol for said securities futures product with an extension designating said trading method and (v) a trading symbol for said securities futures product designating both said securities futures product and said trading method; and wherein said executing is performed by one or more processors, said determining is performed by one or more processors, and said submitting is performed by one or more processors.

2. The method of claim 1, wherein said specified time is at or relative to a closing time for an exchange.

3. The method of claim 1, wherein said basis adjustment is determined by a standardized calculation of the difference between the current valuation and the calculated forward or future value of the underlying financial instrument based on a model incorporating at least one of (a) an interest rate and (b) a dividend forecast.

4. The method of claim 3, wherein at least one of (a) the interest rate, (b) the dividend forecast and (c) the basis adjustment is published by an exchange or a service provider engaged by an exchange.

5. The method of claim 1, wherein at least a portion of the basis adjustment is calculated by or for an organized market for trading said securities futures products or by an industry utility or a data service provider.

6. The method of claim 1, wherein market participants incorporate any basis adjustment into their bids and offers.

7. The method of claim 1, wherein the underlying financial instrument is at least one of (i) a share of a general class of shares of an investment fund, (ii) a share of a specialized share class of an investment fund, (iii) a share of an exchange-traded fund, (iv) a share of a grantor trust, (v) a unit of an exchange-traded note and (vi) a security.

8. The method of claim 1, further comprising using an arbitrary proxy for said base valuation or for said base valuation with a basis adjustment, wherein the proxy serves as an anchor point for said determined price with any difference between the proxy and the anchor point to be translated into currency terms according to rules specified for the market.

9. The method of claim 8, further comprising setting the arbitrary proxy anchor point at a specific number, wherein a trade made at said specific number will be priced at said second price; a trade made below said specific number will be priced at said first price and a trade made at a price above said specific number will be priced at said third price, with any difference from the anchor point measured in currency to a precision determined by rules of a market.

10. The method of claim 1, wherein said executing accommodates bids or offers describing a number of said securities futures product contracts and at market or at a limit price.

11. The method of claim 1, further comprising at least one of (a) computing said base valuation at or after said specified time, (b) computing said base valuation with a basis adjustment at or after said specified time, (c) receiving said base valuation at or after said specified time, and (d) delivering said base valuation at or after said specified time.

12. The method of claim 1, wherein said net asset value is computed from a session opening transaction in each position in a portfolio of an investment fund.

13. The method of claim 1, further comprising at least one of reporting and delivering information on said executed trade to at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

14. The method of claim 1, further comprising receiving information on said executed trade from at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

15. The method of claim 1, further comprising retroactively modifying terms of said executed trade upon correction of an error.

16. The method of claim 1, further comprising at least one of (i) entering a buy or sell order to trade said securities futures product on a graphical user interface, (ii) displaying a buy or sell order to trade said securities futures product on a graphical user interface, and (iii) displaying a buy or sell order to trade said securities futures product on a computer display.

17. A computer-based system for trading an exchange-listed securities futures product (SFP) on an underlying financial instrument for which a valuation equal to a net asset value can be calculated, such trading conducted on a secondary market on or away from an exchange, the system comprising:
a first module configured to execute a trade of said securities futures product, said trade priced on the secondary market as a combination of an adjustment amount known and agreed to by the parties to the trade at the time of the trade, and a base valuation serving as a placeholder for a specific net asset value that will be calculated and published at or after a specified time, wherein a final numerical value will be assigned to said base valuation at or after the specified time;
a second module configured to determine the price for said executed trade from a set of prices that are specified relative to at least one of (i) said base valuation and (ii) said base valuation with a basis adjustment, said set of prices comprising (a) a first price that is at a specified discount to at least one of (i) said base valuation and (ii) said base valuation with a basis adjustment; (b) a second price that is at least one of (i) at said base valuation and (ii) at said base valuation with a basis adjustment; and (c) a third price that is at least one of (i) at a specified premium to said base valuation and (ii) at a specified premium to said base valuation with a basis adjustment;
a third module configured to submit said executed trade for settlement at said determined price;
said first module configured to receive an order to buy or sell said securities futures product; and match said received order with a complementary sell or buy order to trade said securities futures product relative to at least one of (1) said base valuation and (2) said base valuation with a basis adjustment;
wherein a format of said order to trade said securities futures product comprises at least one of (i) a symbol; (ii) a root trading symbol for said securities futures product; (iii) a root trading symbol for said securities futures product and a FIX code designating both said securities futures product and said trading system; (iv) a root trading symbol for said securities futures product with an extension designating said trading method and (v) a trading symbol for said securities futures product designating both said securities futures product and said trading system; and
one or more processors operatively engaged with, and configured to actuate, one or more of said modules.

18. The system of claim 17, wherein said specified time is at or relative to a closing time for an exchange.

19. The system of claim 17, further comprising a standardization module configured to determine a standardized calculation of the difference between the current valuation and the calculated forward or future value of the underlying financial instrument based on a model incorporating at least one of (a) an interest rate and (b) a dividend forecast.

20. The system of claim 19, further comprising a data module configured to provide at least one of (a) the interest rate, (b) the dividend forecast and (c) the basis adjustment as designated by an exchange or a service provider engaged by an exchange.

21. The system of claim 17, wherein said second module is configured to obtain at least a portion of the basis adjustment calculated by or for an organized market for trading said securities futures products or by an industry utility or a data service provider.

22. The system of claim 17, configured to enable market participants to incorporate any basis adjustment into their bids or offers.

23. The system of claim 17, wherein the underlying financial instrument is at least one of (i) a share of a general class of shares of an investment fund, (ii) a share of a specialized share class of an investment fund, (iii) a share of an exchange-traded fund, (iv) a share of a grantor trust, (v) a unit of an exchange-traded note, and (vi) a security.

24. The system of claim 17, further comprising a proxy module configured to accommodate an arbitrary proxy for said base valuation or said base valuation with a basis adjustment, wherein the proxy serves as an anchor point for said determined price with any difference between the proxy and the anchor point translated into currency terms according to rules specified for the market.

25. The system of claim 24, wherein the proxy module is configured to set the arbitrary proxy anchor point at a specific number, wherein a trade made at said specific number will be priced at said second price; a trade made below said specific number will be priced at said first price and a trade made at a price above said specific number will be priced at said third price, with any difference from the anchor point measured in currency to a precision determined by rules of a market.

26. The system of claim 17, wherein said first module is configured to accommodate bids or offers describing a number of said securities futures product contracts and at market or at a limit price.

27. The system of claim 17, wherein said second module is configured to at least one of (a) compute said base valuation at or after said specified time, (b) compute said base valuation with a basis adjustment at or after said specified time, (c) receive said base valuation at or after said specified time, and (d) deliver said base valuation at or after said specified time.

28. The system of claim 17, further comprising a net asset value module configured to compute said net asset value from a session opening transaction in each position in a portfolio of an investment fund.

29. The system of claim 17, further comprising a report module configured to at least one of report and deliver information on said executed trade to at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

30. The system of claim 17, further comprising an information module configured to receive information on said executed trade from at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

31. The system of claim 17, further comprising an error correction module configured to retroactively modify terms of said executed trade upon correction of an error.

32. The system of claim 17, further comprising a graphical user interface module configured to at least one of (i) enable a user to enter a buy or sell order to trade said securities futures product on a graphical user interface, (ii) display a buy or sell order to trade said securities futures product on a graphical user interface, and (iii) display a buy or sell order to trade said securities futures product on a computer display.

33. A computer program product comprising a non-transitory computer usable medium having computer program logic recorded thereon for enabling a processor to trade an exchange-listed securities futures product (SFP) on an underlying financial instrument for which a valuation equal to a net asset value can be calculated, such trading conducted on a secondary market on or away from an exchange, the computer program logic comprising:

a first module configured to execute a trade of said securities futures product, said trade priced on the secondary market as a combination of an adjustment amount known and agreed to by the parties to the trade at the time of the trade, and a base valuation serving as a placeholder for a specific net asset value that will be calculated and published at or after a specified time, wherein a final numerical value will be assigned to said base valuation at or after the specified time;

a second module configured to determine the price of said executed trade from a set of prices that are specified relative to at least one of (i) said base valuation and (ii) said base valuation with a basis adjustment, said set of prices comprising (a) a first price that is at a specified discount to at least one of (i) said base valuation and (ii) said base valuation with a basis adjustment; (b) a second price that is at least one of (i) at said base valuation and (ii) at said base valuation with a basis adjustment; and (c) a third price that is at least one of (i) at a specified premium to said base valuation and (ii) at a specified premium to said base valuation with a basis adjustment; and a third module configured to submit said executed trade for settlement at said determined price said first module configured to receive an order to buy or sell said securities futures product; and match said received order with a complementary sell or buy order to trade said securities futures product relative to at least one of (1) said base valuation and said base valuation with a basis adjustment; and wherein a format of said order to trade said securities futures product comprises at least one of (i) a symbol; (ii) a root trading symbol for said securities futures product; (iii) a root trading symbol for said securities futures product and a FIX code designating both said securities futures product and said trading method; (iv) a root trading symbol for said securities futures product with an extension designating said trading method and (v) a trading symbol for said securities futures product designating both said securities futures product and said trading product.

34. The computer program product of claim 33, wherein said specified time is at or relative to a closing time for an exchange.

35. The computer program product of claim 33, wherein said computer program logic further comprises a standardization module configured to determine a standardized calculation of the difference between the current valuation and the calculated forward or future value of the underlying financial instrument based on a model incorporating at least one of (a) an interest rate and (b) a dividend forecast.

36. The computer program product of claim 35, wherein said computer program logic further comprises a data module configured to provide at least one of (a) the interest rate, (b) the dividend forecast and (c) the basis adjustment as designated by an exchange or a service provider engaged by an exchange.

37. The computer program product of claim 33, wherein said second module is configured to obtain at least a portion of the basis adjustment calculated by or for an organized market for trading said securities futures products or by an industry utility or a data service provider.

38. The computer program product of claim 33, wherein said computer program logic is configured to enable market participants to incorporate any basis adjustment into their bids or offers.

39. The computer program product of claim 33, wherein the underlying financial instrument is at least one of (i) a share of a general class of shares of an investment fund, (ii) a share of a specialized share class of an investment fund, (iii) a share of an exchange-traded fund, (iv) a share of a grantor trust, (v) a unit of an exchange-traded note and (vi) a security.

40. The computer program product of claim 33, wherein said computer program logic comprises a proxy module configured to accommodate an arbitrary proxy for said base valuation or said base valuation with a basis adjustment, wherein the proxy serves as an anchor point for said determined price with any difference between the proxy and the anchor point to be translated into currency terms according to rules specified for the market.

41. The computer program product of claim 38, wherein the proxy module is configured to set said arbitrary proxy anchor point at a specific number, wherein a trade made at said specific number will be priced at said second price; a trade made below said specific number will be priced at said first price and a trade made at a price above said specific number will be priced at said third price, with any difference from the anchor point measured in currency to a precision determined by rules of a market.

42. The computer program product of claim 33, wherein said first module is configured to accommodate bids or offers describing a number of said securities futures product contracts and at market or at a limit price.

43. The computer program product of claim 33, wherein said second module is configured to at least one of (a) compute said base valuation at or after said specified time, (b) compute said base valuation with a basis adjustment at or after said specified time, (c) receive said base valuation at or after said specified time, and (d) deliver said base valuation at or after said specified time.

44. The computer program product of claim 33, wherein said computer program logic further comprises a net asset value module configured to compute said net asset value from a session opening transaction in each position in a portfolio of an investment fund.

45. The computer program product of claim 33, wherein said computer program logic further comprises a report module configured to at least one of report and deliver information on said executed trade to at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

46. The computer program product of claim 33, wherein said computer program logic further comprises an information module configured to receive information on said executed trade from at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

47. The computer program product of claim 33, wherein said computer program logic further comprises an error correction module configured to retroactively modify terms of said executed trade upon correction of an error.

48. The computer program product of claim 33, wherein said computer program logic further comprises a graphical user interface module configured to at least one of (i) enable a user to enter a buy or sell order to trade said securities futures product on a graphical user interface, (ii) display a buy or sell order to trade said securities futures product on a graphical user interface, and (iii) display a buy or sell order to trade said securities futures product on a computer display.

* * * * *